(12) United States Patent
Lawrence et al.

(10) Patent No.: US 11,547,118 B1
(45) Date of Patent: Jan. 10, 2023

(54) NATURAL PESTICIDES, SUBSTANCES AND METHODS OF FABRICATION THEREOF

(71) Applicants: Elbert Lawrence, West Monroe, LA (US); Ronald D. Guthrie, Temple, TX (US); Richard L. Fewell, Jr., West Monroe, LA (US)

(72) Inventors: Elbert Lawrence, West Monroe, LA (US); Ronald D. Guthrie, Temple, TX (US); Richard L. Fewell, Jr., West Monroe, LA (US)

(*) Notice: Subject to any disclaimer, the term of this patent is extended or adjusted under 35 U.S.C. 154(b) by 964 days.

(21) Appl. No.: 16/151,004

(22) Filed: Oct. 3, 2018

Related U.S. Application Data

(60) Provisional application No. 62/567,515, filed on Oct. 3, 2017.

(51) Int. Cl.
| | |
|---|---|
| *A01N 25/00* | (2006.01) |
| *A01N 25/26* | (2006.01) |
| *A01N 37/44* | (2006.01) |
| *A01N 59/06* | (2006.01) |
| *A01N 65/00* | (2009.01) |
| *A01N 25/04* | (2006.01) |

(52) U.S. Cl.
CPC ............. *A01N 65/00* (2013.01); *A01N 25/26* (2013.01); *A01N 37/44* (2013.01); *A01N 59/06* (2013.01); *A01N 25/04* (2013.01)

(58) Field of Classification Search
None
See application file for complete search history.

(56) References Cited

U.S. PATENT DOCUMENTS

| | | | |
|---|---|---|---|
| 5,110,594 A | 5/1992 | Morita | |
| 5,984,994 A * | 11/1999 | Hudson | C05G 5/36 71/64.11 |
| 2006/0134040 A1 | 6/2006 | Glassel et al. | |
| 2006/0135645 A1 | 6/2006 | Glassel et al. | |
| 2014/0335140 A1 | 11/2014 | Hoag et al. | |
| 2019/0343977 A1 * | 11/2019 | Margot | A61L 9/048 |

FOREIGN PATENT DOCUMENTS

| | | | |
|---|---|---|---|
| CN | 103864384 A | * | 6/2014 |
| CN | 106726773 A | * | 5/2017 |
| CN | 107117928 A | * | 9/2017 |
| JP | 2014050781 A | * | 3/2014 |

* cited by examiner

*Primary Examiner* — Alton N Pryor
(74) *Attorney, Agent, or Firm* — R. Keith Harrison

(57) ABSTRACT

Methods of fabricating a natural substance may include obtaining a particulate silica including perlite, preparing a liquid formula having at least one essential oil and preparing the natural substance by applying the liquid formula to the particulate silica.

16 Claims, 8 Drawing Sheets

```
100
  │
  ▼
┌─────────────────────────────┐
│ 102 Obtain silica/perlite   │
│ from source which adds      │
│ water and screens           │
│ silica/perlite to obtain    │
│ silica/perlite particles    │
│ having uniform particulate  │
│ size.                       │
└─────────────────────────────┘
  │
  ▼
┌─────────────────────────────┐       ┌─────────────────────────────┐
│ 104 Obtain food grade       │─────▶ │ 105 Blend silica/perlite    │
│ diatomaceous earth (DE)     │       │ material with DE at         │
│ from source.                │       │ appropriate mixture rate.   │
└─────────────────────────────┘       └─────────────────────────────┘
  │
  ▼
┌─────────────────────────────┐
│ 106 Obtain essential oils   │
│ from source.                │
└─────────────────────────────┘
  │
  ▼
┌─────────────────────────────┐
│ 108 Proportion quantities   │
│ and types of essential oils │
│ and blend together in       │
│ water. Thoroughly blend     │
│ until all components are    │
│ blended. Transfer resulting │
│ liquid formula to storage   │
│ container for future        │
│ blending.                   │
└─────────────────────────────┘
  │
  ▼
┌─────────────────────────────┐
│ 110 Place silica/perlite    │
│ and DE particles in mixing  │
│ device and apply liquid     │
│ formula by means of spray   │
│ or other method to deliver  │
│ liquid formula to           │
│ silica/perlite and DE       │
│ particles at appropriate    │
│ ratio to obtain desired     │
│ consistency.                │
└─────────────────────────────┘
  │
  ▼
┌─────────────────────────────┐       ┌─────────────────────────────┐
│ 112 Mix/blend silica/perlite│─────▶ │ 114 Place silica/perlite/DE/│
│ and DE particles with liquid│       │ essential oil product in    │
│ formula until evenly        │       │ hopper or other sealed      │
│ dispersed to achieve        │       │ container to reduce/prevent │
│ silica/perlite/DE/essential │       │ leaching of vapors and      │
│ oil product of uniform      │       │ retain longer effectiveness │
│ consistency without lumping.│       │ period of silica/perlite/DE/│
└─────────────────────────────┘       │ essential oil product. This │
                                      │ will prepare the            │
                                      │ silica/perlite/DE/essential │
                                      │ oil product for future      │
                                      │ packaging in desired        │
                                      │ containers and/or to be     │
                                      │ blended with other          │
                                      │ components as needed to     │
                                      │ produce other finished      │
                                      │ products.                   │
                                      └─────────────────────────────┘
```

FIG. 1

Base Dust Compound for Pest Dust

Pellet/Dust Product

Pellet/Dust with Zeolite Product

400

402 — Prepare silica/perlite/DE/essential oil product according to steps 102-114 of FIG. 1

404 — Add additional untreated silica/perlite material, at desired ratio, to silica/perlite/DE/essential oil product and blend evenly to form final dust product. Final dust product may be amenable to application using power dusters and puff dusters for pest control purposes.

FIG. 4

Pest Dust Product

Pouched or Vented Container Dust Product

Pouched or Vented Container Pellet/Dust Product

Animal Bedding Material

Application Use for Dust Product

NATURAL PESTICIDES, SUBSTANCES AND METHODS OF FABRICATION THEREOF

CROSS-REFERENCE TO RELATED APPLICATIONS

This application claims the benefit of U.S. provisional application No. 62/567,515, filed Oct. 3, 2017 and entitled NATURAL PESTICIDES, SUBSTANCES AND METHODS OF FABRICATION THEREOF, which application is hereby incorporated by reference herein in its entirety.

FIELD

Illustrative embodiments of the disclosure generally relate to pesticides and pesticide methods. More particularly, illustrative embodiments of the disclosure relate natural pesticides and methods of fabricating natural pesticides and other substances which may be all-natural and environmentally-friendly.

BACKGROUND

The background description provided herein is solely for the purpose of generally presenting the context of the illustrative embodiments of the disclosure. Aspects of the background description are neither expressly nor impliedly admitted as prior art against the claimed subject matter.

Insecticides are substances used in agriculture, medicine and industry and b consumers to kill insects. Insecticides played a role in increasing agricultural productivity in the 20th century.

The use of conventional insecticides and other pesticides may have several drawbacks. For example, many pesticides are toxic to humans, pets and other animals. Inorganic compounds of arsenic, such as, lead arsenate, have long been used against insect pests. These materials, however, are highly toxic to non-target organisms and may remain in the environment long after their application.

In the United States, the Environmental Protection Agency (EPA) is responsible for regulating pesticides to ensure that these products do not pose adverse effects to humans or the environment. Prior to approval, studies may be conducted to establish the conditions under which the proposed pesticide is safe to use and its effectiveness against the intended pest(s). Some natural pesticides such as organic pesticides may be exempt from regulation.

SUMMARY

Illustrative embodiments of the disclosure are generally directed to natural pesticides and methods of fabricating natural pesticides and other substances which may be all-natural and environmentally-friendly. An illustrative embodiment of a method of fabricating a natural substance may include obtaining a particulate silica including perlite, preparing a liquid formula having at least one essential oil and preparing the natural substance by applying the liquid formula to the particulate silica.

BRIEF DESCRIPTION OF THE DRAWINGS

Illustrative embodiments of the disclosure will now be described, by way of example, with reference to the accompanying drawings, in which:

FIG. 1 is a flow diagram which illustrates a general process flow for typical fabrication of a silica/perlite/essential oil product of the natural pesticides, substances and fabrication methods according to illustrative embodiments of the disclosure;

FIG. 4 is a flow diagram which illustrates a typical method of fabrication of a dust product of the natural pesticides, substances and fabrication methods according to illustrative embodiments of the disclosure;

DETAILED DESCRIPTION

Figure 2:
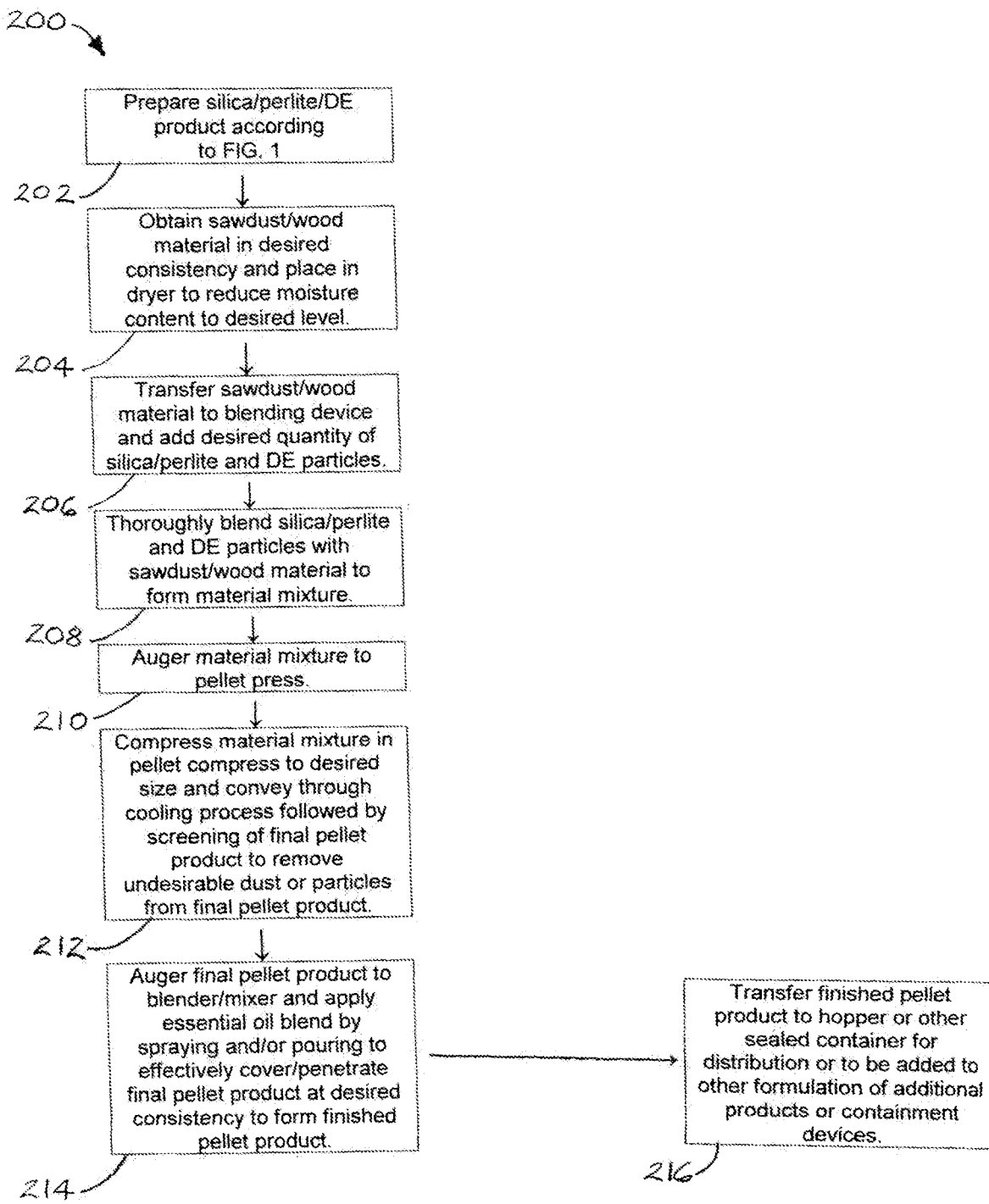
FIG. 2 is a flow diagram which illustrates a typical method of fabrication of a finished pellet product of the natural pesticides, substances and fabrication methods according to illustrative embodiments of the disclosure.

The following detailed description is merely exemplary in nature and is not intended to limit the described embodiments or the application and uses the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. As used herein. "natural" means "fabricated from substances or raw materials which exist in or are caused by nature and not made or caused by humankind".

Illustrative embodiments of the disclosure are generally directed to natural pesticides and substances and methods of fabricating natural pesticides and substances. In some embodiments, the natural pesticides and substances may include liquid natural pesticides. In other embodiments, the natural pesticides may include solid natural pesticides. In still other embodiments, the natural pesticides may include absorbent natural pesticides. In yet other embodiments, the natural substances may be in a solid or liquid form and may be used for aromatherapy and/or other purposes. The solid natural pesticides, the absorbent natural pesticides and the solid natural substances may be applied as powder, shavings, granules, chips, mulch, dust, sawdust, and/or other particles and/or pellets, for example and without limitation.

The natural pesticides may have any of a variety of applications. For example and without limitation, in some applications, the natural pesticides may be placed in a warehouse in which animal feed bags are stored to repel insects, rodents, reptiles, birds, squirrels, armadillos, other mammals and/for other pests. In other applications, the natural pesticides may be applied to flower beds, shrubs, lawns or crops to repel insects, rodents, reptiles, birds, squirrels, armadillos, other mammals and/or other pests. In some applications, the solid natural pesticides and/or the absorbent natural pesticides may be used as moisture or humidity control substances to wick moisture from the environment. For example and without limitation, in some applications, the solid natural pesticides and/or the absorbent natural pesticides may be used as bedding in an environment such as poultry facilities to both repel and kill pests and absorb or sequester ammonia. The natural pesticides may be environmentally-friendly and pose no adverse effects to humans or the environment.

The natural pesticides and substances according to illustrative embodiments of the disclosure may include one or more natural silicates. In some embodiments, the natural silicates may include amorphous alumina silica (perlite). Perlite is an amorphous volcanic glass that has a relatively high water content and is typically formed by the hydration of obsidian. Perlite is a naturally-occurring industrial mineral which is low density after heat processing. Perlite, typically has the following components by weight:

70-75% silicon dioxide ($SiO_2$)
12-15% aluminum oxide ($Al_2O_3$)
3-4% sodium oxide ($Na_2O$)
3-5% potassium oxide ($K_2O$)
0.5-2% iron oxide ($Fe_2O_3$)
0.2-0.7% magnesium oxide (MgO)
0.5-1.5% calcium oxide (CaO)
3-5% loss on ignition (chemical/combined water)

Perlite has the unusual property of greatly expanding when heated sufficiently. Expansion of the perlite enlarges the pores in the perlite and increases the interior surface area of the pores. Perlite softens when it reaches temperatures of 850-900° C. (1,560-1,650° F.). Water trapped in the structure of the material vaporizes and escapes. This causes expansion of the material to 7-16 times its original volume. The expanded material is a brilliant white, due to the reflectivity of the trapped bubbles. Unexpanded ("raw") perlite has a bulk density of around 1100 kg/m$^3$ (1.1 g/cm$^3$), whereas typical expanded perlite has a bulk density of about 30-150 kg/m$^3$ (0.03-0.150 g/cm$^3$).

The natural pesticides and substances may additionally or alternatively include other natural silicates such as zeolite, bentonite and/or vermiculite, for example and without limitation, Zeolite is a hydrated alumino-silicate. Bentonite is an absorbent aluminum phyllosilicate clay. Vermiculite is a hydrous phyllosilicate mineral.

In some embodiments, the natural pesticides may include a biologically effective quantity of at least one essential oil. Non-limiting examples of essential oils which are suitable for the purpose include any combination of the following; garlic oil, lavender oil, gardenia oil, almond bitter oil, anise oil, basil oil, hay oil, caraway oil, cardamom oil, cedar oil, celery oil, chamomile oil, cinnamon oil, citronella oil, clove oil, coriander oil, cumin oil, dill oil, eucalyptus oil, fennel oil, ginger oil, grapefruit oil, lemon oil, lime oil, mint oil, parsley oil, peppermint oil, pepper oil, rose oil, spearmint oil (menthol), sweet orange oil, thyme oil, turmeric oil, oil of wintergreen, juniper oil, tall oil, pine oil and/or lemon grass oil. In some embodiments, the natural pesticides may include methyl anthranilate (grape seed oil) to repel birds. The essential oils may include essential oils which are naturally-occurring and/or synthetic. Lemon grass oil and/or methyl anthranilate (grape seed oil)—can be added to product to repel birds (absorb into perlite powder formulation).

It has surprisingly been found that large quantities of essential oil adhere to the interior pore surfaces of perlite upon application of one or more essential oils to the perlite. As the oil remains on the interior pore surfaces, the concentrated vapors and/or fumigants of the essential oils emanate or evaporate from the adhered oil with the aid of water evaporation from the perlite. The aroma of the essential oils may additionally become hyper-activated as the vapors and/or fumigants evaporate. It has been found that in pest-repellent applications of the natural pesticides, the concentrated vapors and/or fumigants from the essential oil or oils may kill or at least repel pests such as insects, rodents and reptiles. Additionally, the perlite may provide UV-protection to the essential oil in outdoor applications thereby extending the effective period of the essential oil. Because large quantities of the essential oils are absorbed onto the interior pore surfaces of the perlite, large quantities of the essential oil can be incorporated into and onto pellets without affecting the structural or functional integrity of the pellets in some embodiments of the natural pesticides. In the event that water subsequently enters the perlite such as in the event that the perlite absorbs the water from precipitation, for example, the water may re-constitute the essential oils which were absorbed onto the perlite and emanate from the perlite as vapor and/or fumigant. Thus, the pellets can be re-used after re-wetting. In some embodiments, one or more of various essential oils can be selected for inclusion in the natural substances to accentuate the aroma or vapors and/or fumigants of the selected essential oils for aromatherapy or other applications.

The natural pesticides can be applied as a liquid natural pesticide, a solid natural pesticide and/or an absorbent natural pesticide. The liquid natural pesticide may include an essential oil formulation, essential oil blend or liquid formula. The solid natural pesticide may include at least one silica or silica/perlite particles which is/are mixed with the liquid formula. The liquid formula may include a water base, a biologically effective quantity of at least one essential oil, garlic juice and/or other suitable alternative(s), and ethyl lactate and/or other suitable alternative(s). A selected quantity of the silica/perlite particles may be blended with a selected quantity of the liquid formula to form the solid natural pesticide. The solid natural pesticide may then be packaged and used in any of various applications. In some embodiments, the liquid natural pesticide may be formulated to be applied as a sprayed liquid.

The silica/perlite/essential oil product of the solid natural pesticide may be prepared by initially preparing the liquid formula. The liquid formula may include a water base, at least one essential oil, ethyl lactate and garlic juice and/or garlic essential oil and/or other suitable alternative(s). The silica/perlite particles may be processed to expand the silica/perlite particles and obtain particulate silica/perlite typically having a size from powder to course granule. The particulate silica/perlite may then be blended with the liquid formula to prepare a substantially homogenous silica/perlite/essential oil product mixture of the solid natural pesticide.

In some embodiments, the solid natural pesticide may be prepared by applying the liquid formula to at least one natural pesticide substrate. The natural pesticide substrate may be prepared by obtaining at least one natural pesticide raw material and preparing the natural pesticide substrate from the natural pesticide raw material. The natural pesticide raw material may include any type of sawdust/wood material and/or other natural solid material having intrinsic pesticide properties. In some non-limiting embodiments, the sawdust/wood material of the natural pesticide raw material may include cedar wood such as *Juniperus virginiana*, *Juniperus ashei* and/or *Cedrela odorata*, for example and without limitation. The sawdust/wood material may be cut from cedar trees and formed into logs and then stripped, debarked and/or otherwise obtained and processed using conventional wood cutting, harvesting and processing techniques known by those skilled in the art. In some non-limiting embodiments, the sawdust/wood material may include pine wood and/or other hard woods. The sawdust/wood material may include powder, shavings, granules, chips, mulch, dust, other particles and/or pellets, the example and without limitation, which may be prepared from the natural substrate raw material according to the knowledge of those skilled in the art.

The absorbent natural pesticide may be prepared by applying at least one silica to at least one natural pesticide substrate. In some embodiments, at least one binder such as soy lecithin, for example and without limitation, may be used to facilitate adhesion of the silica to the natural pesticide substrate. The absorbent natural pesticide may be used in the form of powder, shavings, granules, chips, mulch, dust, and/or other particles and/or pellets, for example and without limitation, as a moisture or humidity control technique to wick moisture from the environment.

A typical, non-limiting batch of the silica/perlite/essential oil product of the solid natural pesticide may include about 10% water by weight, about 17% cedar oil or other essential oil by weight, about 3% ethyl acetate or ethyl lactate by weight, about 10% peppermint oil or other essential oil by weight, about 20% garlic juice by weight and about 40% silica/perlite by weight. Accordingly, a typical 80-ounce batch of the silica/perlite/essential oil product may include about 8 ounces water, about 13.6 ounces cedar oil, about 2.4 ounces ethyl acetate or ethyl lactate, about 8 ounces peppermint oil, about 16 ounces garlic juice and about 32 ounces polite. In some embodiments, the essential oil may range from at least about 10% by weight to over 30% by weight. The silica/perlite may range from at least about 4% by weight to over 90% by weight. In applications in which the solid natural pesticide is prepared by applying the silica/perlite/essential oil product to the sawdust/wood material or other natural pesticide substrate, the quantity of silica/perlite may be selected such that the solid natural pesticide includes silica in a quantity of from about 0.5 ounces to about 2.0 ounces per pound of natural pesticide substrate. In applications in which the absorbent natural pesticide is prepared by applying the silica to the natural pesticide substrate, the quantity of silica may be selected such that the solid natural pesticide includes silica in a quantity of from about 0.5 ounces to about 2.0 ounces per pound of natural pesticide substrate.

Referring initially to FIG. 1 of the drawings, a flow diagram 100 which illustrates a general process flow tor typical fabrication of solid natural pesticides having a silica/perlite/essential oil product of the natural pesticides, substances and fabrication methods according to illustrative embodiments of the disclosure is illustrated. At Step 102, natural particulate silica or silica/perlite may be obtained. The natural silica/perlite may be obtained from a source which adds water and screens the silica/perlite to obtain silica/perlite particles having uniform particulate size. In some embodiments, the silica/perlite particles may include zeolite particles, bentonite particles, vermiculite particles and/or other natural silicate particles, for example and without limitation.

The natural silica/perlite may be mined using standard or conventional mining techniques. The natural silica/perlite may include amorphous alumina silica (perlite). In some embodiments, the natural silica/perlite particles may additionally or alternatively include other natural silicates such as zeolite, bentonite and/or vermiculite, for example and without limitation.

Expanded silica/perlite may be prepared by subjecting the natural silica/perlite to heat processing. In some embodiments, heat processing may include heating the expanded silica/perlite to a temperature of from about 850° C. (1,560° F.) to about 900° C. (1,650° F.). In some embodiments, heat processing may include one or more cycles of heating and cooling.

The silica/perlite particles may be prepared by subjecting the expanded silica/perlite to mechanical processing. Mechanical processing of the expanded silica/perlite may include crushing, sifting and/or other techniques which are known by those skilled in the art and suitable for the purpose of reducing the particle size of the expanded silica/perlite particles. In some embodiments, the expanded silica/perlite may be processed until the size of the particulate silica/perlite particles is a powder to a course granule.

At Step 104, food-grade diatomaceous earth (DE) may be obtained from a suitable source. In the final pesticide product, the diatomaceous earth may act as an anti-clumping agent to aid in more even blending without lumps for more effective use.

At Step 105, the silica/perlite material obtained at Step 102 may be bended with the DE at an appropriate mixture rate.

At Step 106, at least one essential oil may be obtained from a source. In some embodiments, at least one emulsifier may be obtained from a source. At Step 108, quantities and types of essential oils may be proportioned and blended together in water until all components are blended to form a substantially homogeneous liquid formula. In some embodiments, an emulsifier may be added and thoroughly blended until all components are blended and emulsified. The resulting liquid formula may be transferred to a suitable storage container for future blending.

At Step 110, the silica/perlite particles prepared at Step 102 may be placed in a mixing device. The liquid formula which was prepared at Step 106 may then be applied to the silica/perlite particles in the mixing device by means of a spray and/or other suitable method to deliver the liquid formula to the silica/perlite particles at an appropriate ratio to obtain a desired consistency.

At Step 110, the silica/perlite and DE particles may be mixed or blended with the liquid formula until the silica/perlite and DE particles are evenly dispersed to achieve a solid silica/perlite/DE/essential oil product of uniform consistency without lumping. The essential oil or oils in the liquid formula may adhere to the internal surfaces of the pores in the silica/perlite particles. In some embodiments, methyl anthranilate (grape seed oil) may be added to, mixed with and/or absorbed into the silica/perlite particles to produce a solid natural pesticide product which is effective in repelling birds.

At Step 112, the silica/perlite and DE particles may be mixed or blended with the liquid formula until evenly dispersed to achieve a silica/perlite/DE essential oil product of uniform consistency without lumping.

At Step 114, the solid silica/perlite/DE essential oil product of the natural pesticide may be placed in a hopper or other sealed container to reduce or prevent leaching of vapors and/or fumigants and retain a longer effectiveness period of the silica/perlite/DE essential oil product. This will prepare the silica/perlite/DE/essential oil product for future packaging in desired containers and/or to be blended with other components as needed to produce other finished products. Packaging may include bottling, boxing, bagging, containing and/or other packaging techniques which are known by those skilled in the art and suitable for a particular application of the natural pesticide.

Referring next to FIG. 2 of the drawings, a flow diagram 200 which illustrates a typical method of fabrication of a finished pellet product of the natural pesticides, substances and fabrication methods according to illustrative embodiments of the disclosure is illustrated. At Step 202, a solid silica/perlite/DE/essential oil product may be prepared as was heretofore described with respect to FIG. 1.

At Step 204, sawdust/wood material having a desired consistency may be obtained. The sawdust/wood material may include powder, shavings, sawdust, chips, mulch and/or other strips or particles which may be obtained by subjecting a natural pesticide raw material to chipping in a wood chipper and/or grinding in a conventional hammer mill, for example and without limitation. In some applications, the chipping and/or grinding process may produce a sawdust/wood material having a uniform dough-like mass. The sawdust/wood material may be placed in a dryer to reduce moisture content to a desired level.

The sawdust/wood material may include any type of wood and/or other natural solid material having intrinsic pesticide properties. The sawdust/wood material may include powder, shavings, granules, chips, mulch, sawdust, dust, strips, bark and/or other particles, for example and without limitation. In some non-limiting; embodiments, the sawdust/wood material may include cedar wood. Non-limiting examples of cedar wood which are suitable for the sawdust/wood material include *Cedrela odorata*, which is a fragrant, insect-repellent and lightweight cedar wood. *Juniperus virginiana* and *Juniperus ashei*. The sawdust/wood material may be cut from cedar trees and formed into logs and then stripped, debarked and/or otherwise obtained and processed using conventional wood cutting, harvesting and processing techniques known by those skilled in the art. In some non-limiting embodiments, the sawdust/wood material may include pine wood.

At Step 206, the sawdust/wood material may be transferred to a suitable blending device. A desired quantity of silica/perlite and DE particles may be added to the sawdust/wood material.

At Step 208, the silica/perlite and DE particles may be thoroughly blended with the sawdust/wood material to form a material mixture.

At Step 210, the material mixture prepared at Step 208 may be augered or otherwise transferred to a pellet press.

At Step 212, the material mixture may be compressed in a pellet, press to form a pellet product having a desired pellet size. The pellet product may next be conveyed through a cooling process. The pellet product may then be screened to form a final pellet product by removing undesirable dust or particles from the pellet product.

At Step 214, the final pellet product prepared at Step 212 may be augered or otherwise transferred to a blender/mixer. The liquid formula prepared at Steps 106 and 108 of FIG. 1 may be applied to the final pellet product to effectively cover or penetrate the final pellet product at a desired consistency to form a finished pellet product.

At Step 216, the finished pellet product prepared at Step 214 may be placed in a hopper or other sealed container until ready for shipment, distribution or future use or to be added to or blended with another formulation of additional products or containment devices.

The finished pellet product may be fabricated using conventional pellet milling techniques known by those skilled in the art. For example and without limitation, in some applications, the sawdust/wood material obtained at Step 204 may be fed to a press in which the sawdust/wood material is forced through a die having openings that correspond to the desired size of the final pellet product. The temperature of the final pellet product may rise such that lignin in the cedar and/or other wood plasticizes and holds the pellets together as the mass cools.

Figure 3:
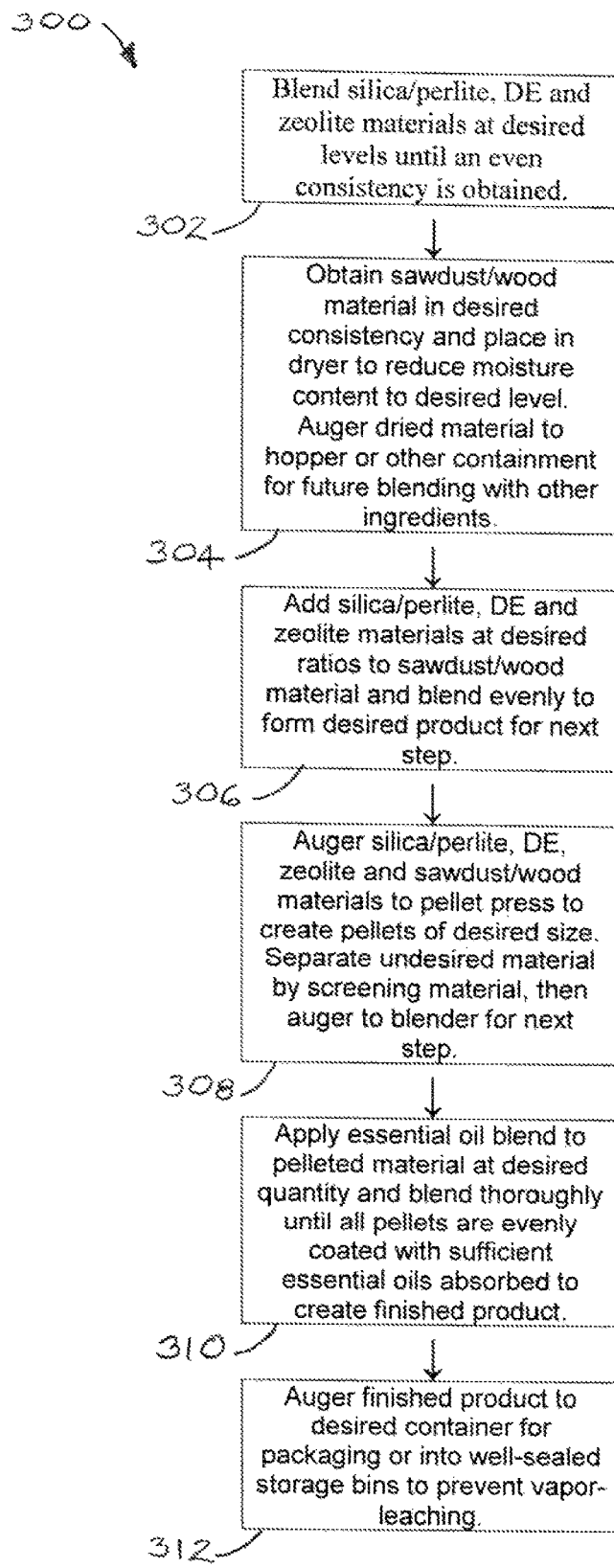
FIG. 3 is a flow diagram which illustrates a typical method of fabrication of a finished sawdust/wood product of the natural pesticides, substances and fabrication methods according to illustrative embodiments of the disclosure.
Figure 5:
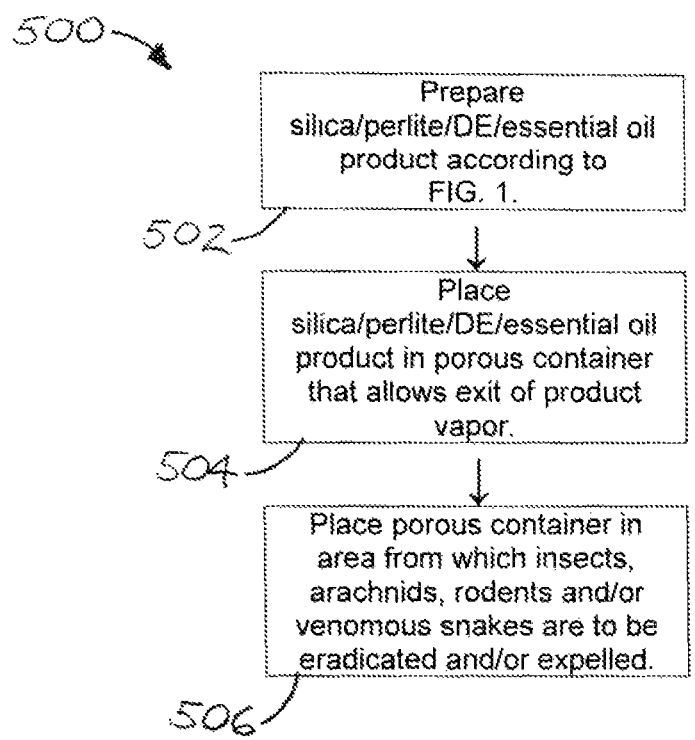
FIG. 5 is a flow diagram which illustrates a typical method of application or a silica/perlite/essential oil product of the natural pesticides, substances and fabrication methods according to illustrative embodiments of the disclosure.
Figure 6:
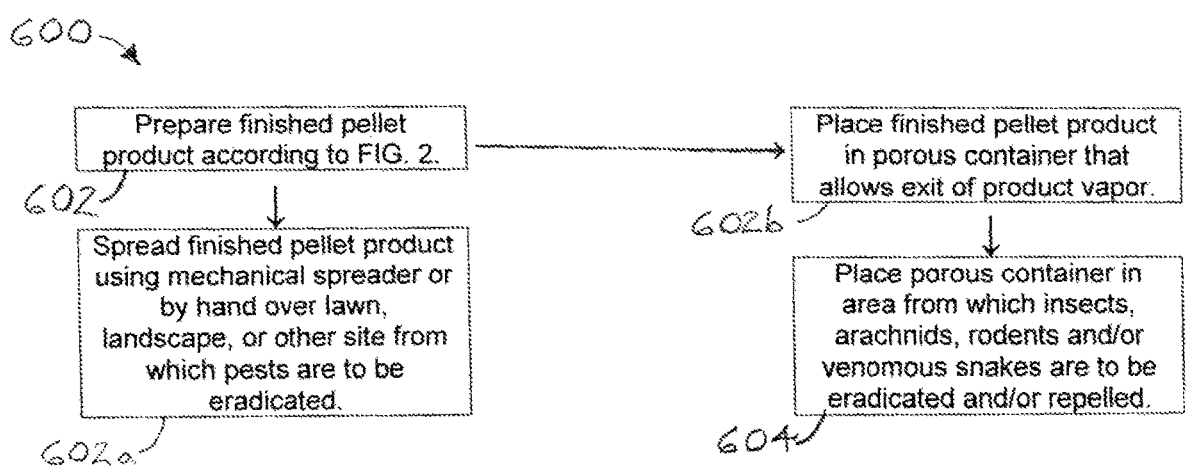
FIG. 6 is a flow diagram which illustrates a typical method of application for a finished pellet product of the natural pesticides, substances and fabrication methods according to illustrative embodiments of the disclosure.
Figure 7:
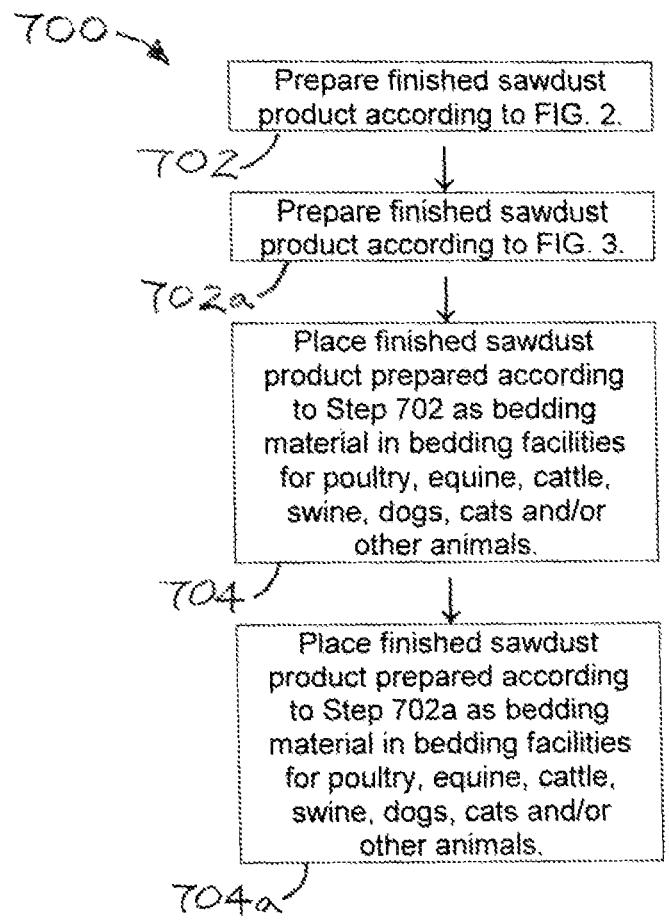
FIG. 7 is a flow diagram which illustrates a typical method of application for a finished sawdust product of the natural pesticides, substances and fabrication methods according to illustrative embodiments of the disclosure.
Figure 8:
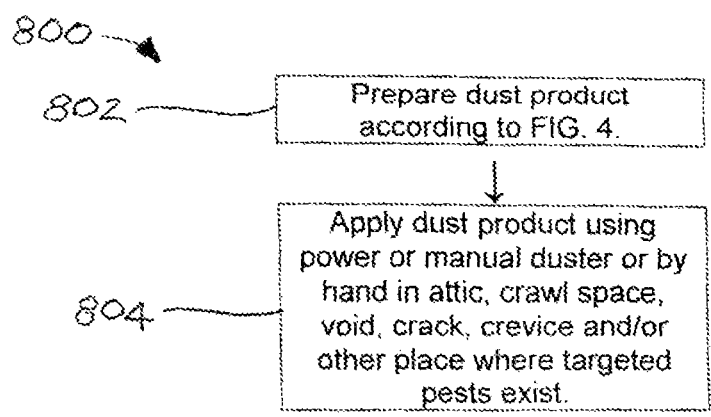
FIG. 8 is a flow diagram which illustrates a typical method of application for a dust product of the natural pesticides, substances and fabrication methods according to illustrative embodiments of the disclosure.

Referring next to FIG. 3 of the drawings, a flow diagram 300 which illustrates a typical method of fabrication of a finished sawdust/wood product of the natural pesticides, substances and fabrication methods according to illustrative embodiments of the disclosure is illustrated. At Step 302, silica/perlite, DE and zeolite materials may be blended at desired levels until an even consistency is obtained. At Step 304, sawdust/wood material in a desired consistency may be obtained and placed in a dryer to reduce moisture content to a desired level. The dried sawdust/wood material may be augered and/or otherwise delivered to a hopper or other containment for future blending with other ingredients.

At Step 306, the silica/perlite, DE and zeolite materials blended at Step 302 may be added at desired ratios to sawdust/wood material and blended evenly to form a desired product for the next step.

At Step 308, the blended silica/perlite, DE, zeolite and sawdust/wood materials may be augered or otherwise delivered to a pellet press to create pellets of desired size. Undesired material may be separated from the pellets by screening the materials. The screened pellets may then be augered or otherwise delivered to a blender for the next step.

At Step 310, the essential oil blend or liquid formula may be applied to the pellets prepared at Step 308 at a desired quantity and blended thoroughly until all pellets are evenly coated with sufficient quantities of essential oil absorbed into the pellets to create a finished pellet product.

At Step 312, the finished pellet product may be augered or otherwise transferred to a desired container for packaging or into well-storage bins to prevent vapor-leaching.

Referring next to FIG. 4 of the drawings, a flow diagram 400 which illustrates a typical method of fabrication of a natural pesticide dust product of the solid natural pesticide according to illustrative embodiments of the disclosure is illustrated. At Step 402, a solid silica/perlite/DE/essential oil product may be prepared according to Steps 102-114 of FIG. 1. At Step 404, additional untreated silica/perlite material may be added, at a desired ratio, to the silica/perlite/DE/essential oil product and blended evenly to form a final natural pesticide dust product. The final natural pesticide dust product may be amenable to application using power dusters and/or puff dusters for pest control purposes, for example and without limitation. In some applications, the final natural pesticide dust product may be dispensed into voids such as attics and other spaces in homes, buildings or other structures. Accordingly, the final natural pesticide dust product may kill or repel insects, rodents, reptiles, birds, squirrels, armadillos, other mammals and other pests. In some embodiments, diatomaceous earth (DE) in the final natural pesticide dust product may act as an anti-clumping agent to aid in more even blending without lumps for more effective use.

In some embodiments, methyl anthranilate, or grape seed extract, may be obtained from a supplier and applied to the final natural pesticide dust product to form a finished natural pesticide dust product. The finished natural pesticide dust product may be poured or otherwise placed in a porous container (not illustrated). The porous container may be placed in an area from which birds are to be repelled. Accordingly, vapor and/or fumigant which emanates from the finished natural pesticide dust product may exit the container through the pours or openings in the container to repel the birds from the area.

Referring next to FIG. 5 of the drawings, a flow diagram 500 which illustrates a typical method of application for a silica/perlite/essential oil product of the solid natural pesticides according to illustrative embodiments of the disclosure is illustrated. At Step 502, a solid silica/perlite/DE/essential oil product may be prepared according to Steps 102-112 of FIG. 1. At Step 504, the silica/perlite/DE/essential oil product may be placed in a porous container which allows exit of product vapor and/or fumigant from the silica/perlite/DE/essential oil product. At Step 506, the porous container may be placed in an area from which insects, arachnids, rodents and/or venomous snakes are to be eradicated. The concentrated vapor and/or fumigant of the essential oil or oils may escape or emanate from the silica/perlite/DE/essential oil product. The concentrated vapor and/or fumigant may kill or repel pests such as insects, rodents and reptiles. In some applications, the porous container may be placed in an animal feed container to preserve the freshness of animal feed in the animal feed container and prevent pests from scavenging the animal feed.

Referring next to FIG. 6 of the drawings, a flow diagram 600 which illustrates a typical method of application for a finished pellet product of the natural pesticides, substances and fabrication methods according to illustrative embodiments of the disclosure is illustrated. At Step 602, a finished pellet product may be prepared according to FIG. 2. At Step 602*a*, in some applications, the finished pellet product may be spread using a mechanical spreader or by band over a lawn, landscape or other site from which pests are to be eradicated. At Step 602*b*, in alternative applications, the finished pellet product may be placed in a porous container which allows exit of product vapor and/or fumigant from the finished pellet product. At Step 604, the porous container may be placed in an area from which insects, arachnids, rodents and/or venomous snakes are to be eradicated. In some applications, the porous container may be placed in an animal feed container to preserve the freshness of animal feed in the animal feed container and prevent pests from scavenging the animal feed.

Referring next to FIG. 7 of the drawings, a blow diagram 700 which illustrates a typical method of application for a finished sawdust product as an animal bedding material of the natural pesticides, substances and fabrication methods according to illustrative embodiments of the disclosure is illustrated. At Step 702, a finished sawdust product may be prepared according to FIG. 2. At Step 702*a*, a finished sawdust product may be prepared according to FIG. 3. At Step 704, the finished sawdust product prepared according to Step 702 may be placed as bedding material in bedding facilities for poultry, equine, cattle, swine, dogs, cats and/or other animals. At Step 704*a*, the finished sawdust product prepared according to Step 702 may be placed as bedding material in bedding facilities for poultry, equine, cattle, swine, dogs, cats and/or other animals. Accordingly, the finished sawdust product as bedding material may kill or repel insects, arachnids, rodents, venomous snakes, squirrels, armadillos, other mammals and/or other pests from the bedding facilities. Additionally, zeolite, bentonite, vermiculite and/or other silicate material in the finished sawdust product may absorb or sequester ammonia from the bedding in the facilities.

Referring next to FIG. 8 of the drawings, a flow diagram 800 which illustrates a typical method of application for a natural pesticide dust product of the natural pesticides, substances and fabrication methods according to illustrative embodiments of the disclosure is illustrated. At Step 802, a final natural pesticide dust product may be prepared as was heretofore described with respect to FIG. 4. At Step 804, the final natural pesticide dust product may be applied using a power or manual duster or by hand in an attic, crawl space, void, crack, crevice and/or other place where targeted pests exist.

In some embodiments, methyl anthranilate, or grape seed extract, may be obtained from a supplier and applied to the final natural pesticide dust product to form a finished natural pesticide dust product. The finished natural pesticide dust product may be poured or otherwise placed in a porous container (not illustrated). The porous container may be placed in an area from which birds are to be repelled. Accordingly, vapor and/or fumigant which emanates from the finished natural pesticide dust product may exit the container through the pours or openings in the container to repel the birds from the area.

In some non-limiting applications, the liquid silica/perlite/essential oil product of the natural pesticide which may be prepared according to Steps 104 and 106 of FIG. 1 may be packaged in a spray bottle. The liquid natural pesticide may be dispensed from the spray bottle through a spray nozzle. The concentrated vapors and/or fumigants from the sprayed pesticide may kill and repel insects, rodents, reptiles, birds, squirrels, armadillos, other mammals and other pests on contact.

It will be appreciated by those skilled in the art that the natural pesticides and substances of the disclosure are applicable as pesticides, as described above, or in other applications such as aromatherapy. One or more of the various essential oils can be selected for inclusion in the liquid natural pesticide or the solid natural pesticide in selected concentrations or ratios to accentuate the aroma or vapors and/or fumigants of the selected essential oils for various aromatherapy or other applications.

In some applications, a natural bird-repellant substance may be prepared by combining perlite and/or other natural silica with methyl anthranilate, or grape seed extract. The grape seed extract is absorbed into the perlite. In some applications, soybean oil and/or other suitable component may be included as a binder which binds the grape seed extract to the interior pore surfaces of the perlite. The natural bird-repellant substance may be placed in a heated container, which may be placed in or under a tree or other area from which birds are to be repelled. Accordingly, upon heating of the container, the natural silica may function as a hazer machine to produce an unobtrusive, homogenous vapor cloud of the concentrated vapors and/or fumigants from the essential oils which is suspended in the air. The concentrated vapors and/or fumigants in the vapor cloud may irritate the nasal passages of birds and repel the birds from the area.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A method of fabricating a natural substance for an agricultural application, comprising:
   obtaining at least one particulate silica including perlite;
   preparing a liquid formula having at least one essential oil;
   preparing the natural substance by applying the liquid formula to the at least one particulate silica;
   obtaining diatomaceous earth (DE), and wherein preparing the natural substance by applying the liquid formula to the at least one particulate silica comprises the preparing the natural substance by applying the liquid formula to the at least one particulate silica and the diatomaceous earth; and wherein the method uses only natural substances.

2. The method of claim 1 further comprising expanding the at least one particulate silica by subjecting the at least one particulate silica to heat processing.

3. The method of claim 2 further comprising reducing a particle size of the at least one particulate silica including perlite to a powder to a course granule by subjecting the at least one particulate silica including perlite to mechanical processing.

4. The method of claim 1 wherein obtaining at least one particulate silica including perlite comprises obtaining at least one particulate silica including perlite in combination with at least one of the following: zeolite particles, bentonite particles and vermiculite particles.

5. The method of claim 1 wherein obtaining at least one particulate silica including perlite comprises adding water to and screening the at least one particulate silica including perlite to obtain particles of the at least one particulate silica including perlite having uniform particulate size.

6. The method of claim 1 wherein preparing a liquid formula having at least one essential oil comprises preparing a liquid formula having at least one essential oil including any combination of the following: garlic oil, lavender oil, gardenia oil, almond bitter oil, anise oil, basil oil, bay oil, caraway oil, cardamom oil, cedar oil, celery oil, chamomile oil, cinnamon oil, citronella oil, clove oil, coriander oil, cumin oil, dill oil, eucalyptus oil, fennel oil, ginger oil, grapefruit oil, lemon oil, lime oil, mint oil, parsley oil, peppermint oil, pepper oil, rose oil, spearmint oil, menthol, sweet orange oil, thyme oil, turmeric oil, oil of wintergreen, juniper oil, tall oil, pine oil and lemon grass oil.

7. A method of fabricating a natural substance, comprising:
   obtaining at least one particulate silica including perlite;
   obtaining diatomaceous earth;
   preparing a liquid formula having at least one essential oil;
   preparing the natural substance by applying the liquid formula to the at least one particulate silica and the diatomaceous earth;
   wherein preparing the liquid formula having at least one essential oil comprises preparing the liquid formula including methyl anthranilate; and wherein the method uses only natural substances.

8. A method of fabricating a solid natural substance, comprising:
   preparing a solid silica/perlite/essential oil product by:
      obtaining at least one particulate silica including perlite;
      preparing a liquid formula having at least one essential oil; and
      applying the liquid formula to the at least one particulate silica;
   obtaining at least one natural pesticide substrate having intrinsic pesticide properties;
   applying the solid silica/perlite/essential oil product to the at least one natural pesticide substrate,
   obtaining diatomaceous earth, and wherein the preparing the solid silica/perlite/essential oil product the comprises preparing a solid silica/perlite/DE/essential oil product by applying the liquid formula to the at least one particulate silica and the diatomaceous earth; and
   wherein the method uses only natural substances.

9. The method of claim 8 wherein obtaining at least one natural pesticide substrate comprises obtaining at least one wood material and wherein applying the solid silica/perlite/essential oil product to the at least one natural pesticide substrate comprises applying the solid silica/perlite/ DE/essential oil product to the at least one wood material.

10. The method of claim 9 further comprising fabricating a final pellet product by compressing the at least one wood material, and wherein applying the solid silica/perlite/DE/essential oil product to the at least one natural pesticide substrate comprises applying the solid silica/perlite/DE/essential oil product to the final pellet product to form a finished pellet product.

11. The method of claim 8 wherein the obtaining at least one particulate silica including perlite comprises obtaining at least one particulate silica including perlite in combination with at least one of the following: zeolite particles, bentonite particles and vermiculite particles.

12. The method of claim 9 wherein obtaining the at least one wood material comprises obtaining at least one of the following: powder, shavings, granules, chips, mulch, sawdust, dust, strips and bark.

13. The method of claim 8 wherein obtaining the at least one natural pesticide substrate having intrinsic pesticide properties comprises obtaining at least one natural pesticide raw material and preparing the natural pesticide substrate from the at least one natural pesticide raw material.

14. The method of claim 13 wherein obtaining the at least one natural pesticide raw material comprises obtaining cedar wood including at least one of *Juniperus virginiana, Juniperus ashei* and *Cedrela odorata*, and pine wood.

15. A method of fabricating a solid natural substance, comprising:
   preparing a solid silica/perlite/essential oil product by:
      obtaining at least one particulate silica including perlite;
      obtaining diatomaceous earth;
      preparing a liquid formula having at least one essential oil; and
      applying the liquid formula to the at least one particulate silica and the diatomaceous earth;
   obtaining at least one natural pesticide substrate having intrinsic pesticide properties;
   applying the solid silica/perlite/essential oil product to the at least one natural pesticide substrate;
   wherein preparing the liquid formula having at least one essential oil comprises preparing the liquid formula including methyl anthranilate; and wherein the method uses only natural substances.

16. A method of fabricating a natural pesticide dust product, comprising:
    obtaining silica/perlite particles having uniform particulate size;
    obtaining diatomaceous earth (DE); and
    forming a silica/perlite/DE mixture by blending the silica/perlite particles with the diatomaceous earth;
    preparing a silica/perlite/DE/essential oil product by:
        obtaining at least one essential oil;
        preparing a liquid formula having the at least one essential oil; and
        applying the liquid formula to the silica/perlite/DE mixture;
    obtaining at least one additional silica/perlite material; and
    yielding a natural pesticide dust product by applying the at least one additional silica/perlite material to the silica/perlite/DE/essential oil product:,
    wherein preparing the liquid formula having the at least one essential oil comprises preparing the liquid formula including methyl anthranilate; and wherein the method uses only natural substances.

* * * * *